(No Model.)

W. D. LINDSLEY.
SEED PLANTER.

No. 414,420.        Patented Nov. 5, 1889.

UNITED STATES PATENT OFFICE.

WILLIAM DARWIN LINDSLEY, OF HUNTSVILLE, KANSAS.

SEED-PLANTER.

SPECIFICATION forming part of Letters Patent No. 414,420, dated November 5, 1889.

Original application filed March 11, 1889, Serial No. 302,753. Divided and this application filed June 29, 1889. Serial No. 315,975.

(No model.)

*To all whom it may concern:*

Be it known that I, WILLIAM DARWIN LINDSLEY, a citizen of the United States, residing at Huntsville, in the county of Reno and State of Kansas, have invented certain new and useful Improvements in Seeding-Machines, of which the following is a specification, the application on which this patent is granted being a division of the original application filed March 11, 1889, patented July 2, 1889, No. 406,360.

My invention has reference to a seeding mechanism combined with a mold-board plow of the type commonly called a "stubble-plow." Such plows are made in great variety, with and without wheels, but are commonly provided with handles and known as "walking-plows."

It is found exceedingly difficult to use a seeding mechanism in connection with these plows in such manner as to meet the practical requirements. These requirements are, first, that the grain shall be scattered evenly over the bottom of the furrow throughout its width; second, that the seed must be delivered immediately behind the plow and while the momentum of the furrow-slice is upward, as otherwise a portion of the earth will fall into the furrow and, partially filling the same, prevent the distribution of the seed.

In order to secure proper distribution of the seed, I employ in connection with the plow a suitable seed-hopper, a seed-distributer or feed-wheel, and a spout or conductor extending downward over the feeder and terminating near the ground in two delivery-mouths, one at the right and the other at the left of the furrow.

Figure 1:
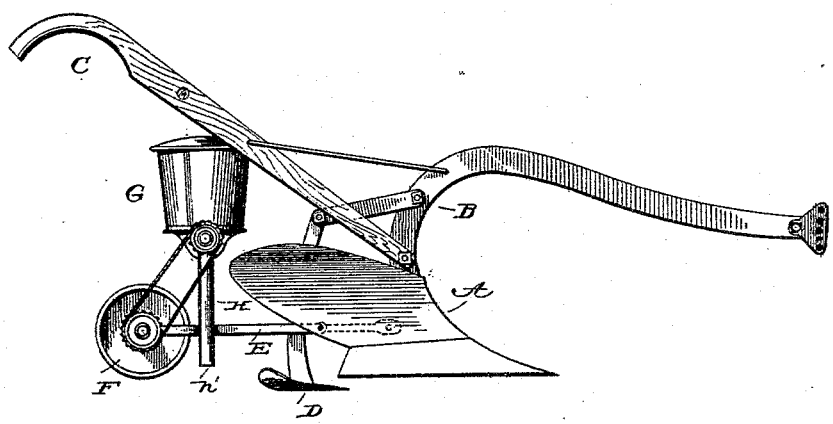
Figure 2:
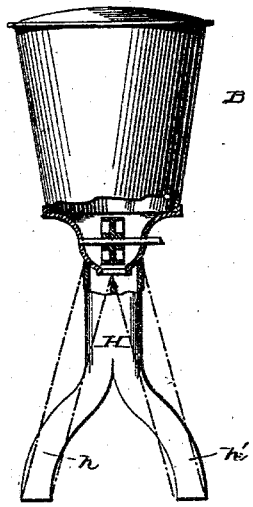

In the accompanying drawings, Figure 1 is a side elevation, and Fig. 2 a rear elevation, of an implement constructed on my plan.

Referring to the drawings, A represents a mold-board plow of ordinary construction, which may be either a walking or a sulky plow.

B is the ordinary beam, C the handles, and D a subsoiling device arranged behind the mold-board. This is commonly used, but does not constitute a necessary feature of my invention.

E represents a vertically-swinging arm connected at its forward end to the plow and sustaining at its rear end a vertical furrow-wheel F.

G is a seed box or hopper mounted on the upper end of a spout or conductor H, which is in turn secured to and supported by the arm E. The hopper is formed, as shown in Fig. 2, with a central depressed bottom forming the seed-cup and having a suitable outlet for the seed.

A vertically-revolving feed-wheel is mounted within the hopper-bottom or cup, and acts to deliver the seed uniformly into the spout or conductor H. This spout is divided at any suitable point in its length into two arms or legs, which are deflected, respectively, to the right and left, so that the descending seed is divided and delivered through the mouths at the lower ends of the spout directly into the right and left sides of the furrow respectively.

The essence of my invention consists in the seed mechanism provided with a conducting-spout, the lower end of which has two delivery-mouths at opposite sides of the furrow and directly behind the plow.

Having thus described my invention, what I claim is—

1. A mold-board plow, a seed-dropping mechanism, and a conductor leading downward from said mechanism and terminating behind the mold-board in two delivery-mouths, one at the right and the other at the left side of the furrow.

2. In combination with a mold-board plow, a seed-hopper having the seed cup or chamber at the base, a vertically-revolving wheel in said chamber to deliver the seed therefrom, and a conductor-spout, into the upper end of which the seed is delivered and the lower end of which is divided and provided with two delivery-mouths, one on the right and the other on the left of the center line of the furrow.

3. The combination, with a mold-board plow, of a seeding mechanism with two delivery-mouths arranged to discharge the seed at opposite sides of one and the same furrow.

In testimony whereof I hereunto set my hand, this 25th day of June, 1889, in the presence of two attesting witnesses.

WILLIAM DARWIN LINDSLEY.

Witnesses:
ARTHUR SEVERANCE,
E. M. BLACHLY.